June 11, 1957 — E. J. MORIARTY — 2,795,433

HAND TRUCK

Filed April 9, 1954

INVENTOR
Edward J. Moriarty

BY McMorrow, Berman & Davidson
ATTORNEYS

United States Patent Office

2,795,433
Patented June 11, 1957

2,795,433
HAND TRUCK
Edward J. Moriarty, Cincinnati, Ohio

Application April 9, 1954, Serial No. 422,094

3 Claims. (Cl. 280—47.28)

This invention relates to hand trucks, and more specifically to an improved hand truck having a fixed loading platform and load engaging arms which are adapted to be positioned to retain a load on the platform.

One of the primary objects of this invention is to provide in a device of the type described with means for positively locking the movable load engaging arms in any selected adjusted position.

Another object of this invention is to provide locking means for the adjustable load engaging arms of a hand truck which increases the locking action as the weight of the load on the arms increases.

A further object of this invention is to provide a locking device for the adjustable load engaging arms of a hand truck, the device being easily released by the manual operation of one hand of the operator and automatically set upon release by the operator.

A still further object of this invention is to provide a handle including locking means whereby the adjustable load engaging arms may be moved to a selected position by one hand of the operator and automatically locked in its adjusted position.

Another important object of this invention is to provide a wheeled hand truck with adjustable load engaging arms to facilitate the moving of articles of furniture having legs such as dressers, chairs, stoves and other kinds of furnishings.

This invention contemplates the provision of a device to which reference has been made which is inexpensive to manufacture, noncomplex in construction and assembly, and durable in use.

Other and further objects and advantages of this invention will become more apparent from a consideration of the following specification when read in the light of the annexed drawing, in which.

Figure 1:
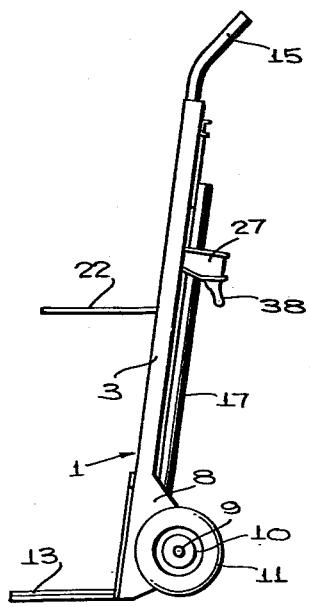
Figure 1 is a side elevation of a hand truck constructed in accordance with the teachings of this invention.

Referring now more specifically to the drawing, reference numeral 1 designates, in general, a hand truck constructed in accordance with this invention. The hand truck 1 comprises a substantially rectangular normally vertical frame formed of a pair of elongated side members 2, 3, which are shown as being channel-shaped in cross section but which may be of any other suitable form such as T-shape or tubular, held in spaced parallel relation by the pair of longitudinally spaced and parallel transversely curved cross bars 4, 5 adjacent the upper end thereof, and the relatively flat cross brace 6 adjacent the lower end of the frame.

Flanges 7, 8 project rearwardly from the side members 2, 3 respectively, and support a shaft 9 which projects on the outer sides of the flanges and provides mounting means for wheels 10 having tires 11. Fenders 12 are secured to the lower end of the side members 2, 3 and overlie the tires 11.

A conventional lift platform 13 is secured to and projects forwardly from the chassis adjacent its lower end.

The side members 2, 3 terminate in handles 14, 15 at their respective upper ends, and a spacer bar 16 extends between and is connected to the cross bars 4, 5 to assist in maintaining their parallelism.

An elongated preferably tubular rod 17 extends longitudinally of the frame behind the side members 2 and 3, and has one of its ends secured to the underside of the cross bar 5 intermediate its ends while the other end thereof is fixedly secured to the cross brace 6.

Adjustable load engaging means are provided and comprises a horizontal cross bar 18, depending bars 19, 20 secured to the ends of the bar 18, and terminating at their lower ends in parallel spaced load engaging arms 21, 22 which parallel the platform 13.

Figure 3:
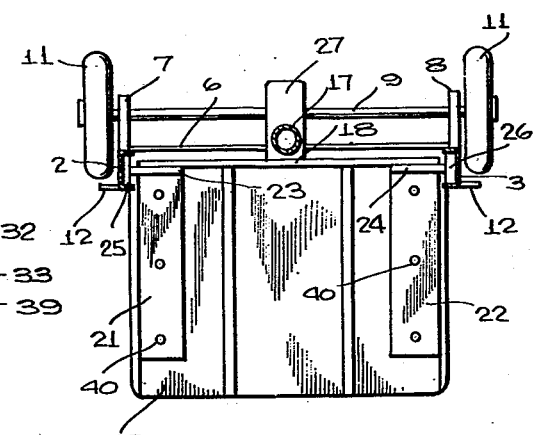
Figure 3 is a cross sectional view taken on the horizontal plane of line 3—3 of Figure 2, looking in the direction of the arrows.

Extension arms 23, 24 are secured to opposite ends of the cross bar 18 and, as shown in Figure 3, substantially rectangular shoes 25, 26 are secured to the projecting ends of the arms 23, 24 and ride in the related U-shaped channel frame side members 2 and 3 which serve as guides during vertical adjustment of the load engaging means.

A substantially rectangular open bottom housing 27 is welded or otherwise secured at 28 to the underside of the cross bar 18 and has a chamber 29 therein. The upper wall 30 of the housing 27 is provided adjacent the inner end thereof with a transverse opening 31 which receives the upright tubular member 17 therethrough.

The other end of the housing 27 is provided with a cylindrical socket 32 which communicates with the chamber 29 and has its longitudinal axis substantially parallel to the longitudinal axis of the tubular member 17. A helical spring 33 under compression is disposed in the socket 32 and serves a function to be described.

A cam 34 is pivotally mounted in the chamber 29 on a pivot pin 35 supported on the opposed side walls 36 thereof. The cam 34 has a plurality of transverse serrations 37 on the high side thereof adapted to engage the tubular member 17, and has a hand lever 38 which projects downwardly and outwardly of the housing 27. The cam 34 is also provided with a lug 39 which extends into the lower end of the socket 32 and serves as a bearing surface for the lower end of the spring 33.

A further feature of this invention comprises the provision of a plurality of snap fastener openings 40 on the frame side member 2 and 3 adapted to receive cooperating parts of fasteners secured to a furniture pad (not shown).

Figure 2:
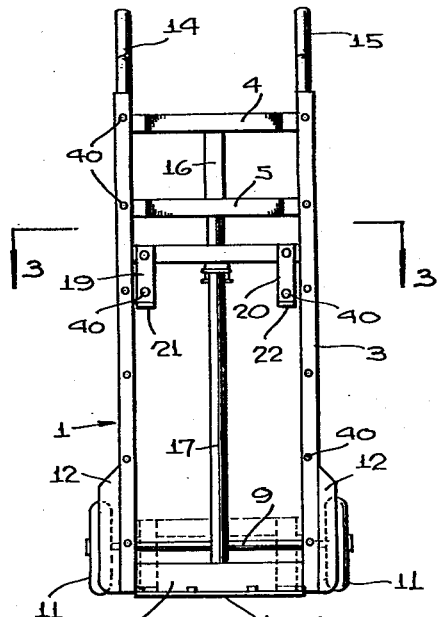
Figure 2 is a front elevation of the hand truck shown in Figure 1.
Figure 4:
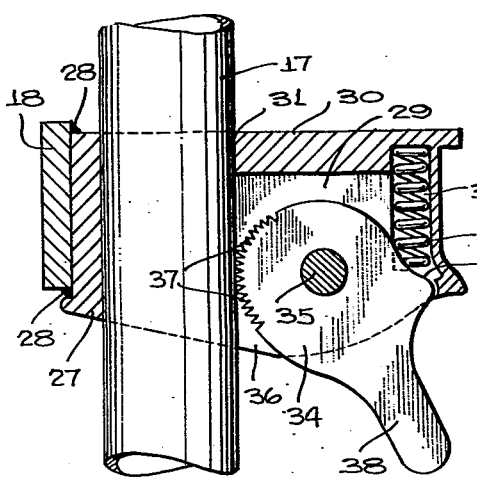
Figure 4 is an enlarged longitudinal cross sectional view, partly in elevation, illustrating details of the locking means.

Assuming that the load engaging arms 21 and 22 have been adjusted to the position shown in Figures 1 and 2 and that it is desired to adjust the members to a lower position. The operator lifts the hand lever 38 with his finger thereby rotating the cam 34 downwardly, and compressing the spring 33 so as to move the high side of the cam with its serrations 37 away from the tubular member 17 thereby freeing the housing 27 for downward movement along the tube 17. With this movement, the load engaging arms secured to the housing are also moved downwardly to the desired position. The lever 38 is then released and the spring 33 acting on the lug 39 rotates the cam 34 clockwise to cause reengagement of the teeth 37 with the tubular member 17 so as to lock the housing 27 and its associated elements thereon.

To raise the load engaging structure, the locking cam 34 is released from engagement with the tubular member 17 as explained above and with one hand the operator grasps the housing 27 and moves it upwardly to a selected position. The lever 38 is then released and the cam 34 reengages the tubular member 17 and locks the housing 27 and the load engaging structure in its new position.

Having described and illustrated one embodiment of this invention in detail, it will be understood that the same is offered by way of example, and that the invention is only to be limited by the scope of the following claims.

What is claimed is:

1. In a hand truck, a normally vertical frame comprising a pair of laterally spaced side members having upper and lower ends and front and rear sides, a cross brace extending between and fixed to said side members at the lower ends of said side members, a cross bar extending between and fixed to said side members at the upper ends of said side members, a vertical rod parallel to and spaced between said side members, said vertical rod having an upper end fixed to said cross bar and a lower end fixed to said frame cross brace, a load carrying platform mounted on and projecting forwardly from the lower ends of the frame side members, a cross member extending between the frame side members, said cross member having shoes on its opposite ends engaging said frame side members and confined to vertical movement therealong, load engaging arm means fixed on and projecting forwardly from said cross member, and releasable clamping means fixed on said cross member at a point intermediate the ends of said cross member, said clamping means embracing said vertical rod to hold said load engaging arm means at a selected elevation above said load carrying platform.

2. In a hand truck, a normally vertical frame comprising a pair of laterally spaced side members having upper and lower ends and front and rear sides, a cross brace extending between and fixed to said side members at the lower ends of said side members, a cross bar extending between and fixed to said side members at the upper ends of said side members, a vertical rod parallel to and spaced between said side members, said vertical rod having an upper end fixed to said cross bar and a lower end fixed to said frame cross brace, a load carrying platform mounted on and projecting forwardly from the lower ends of the frame side members, a cross member extending between the frame side members, said cross member having shoes on its opposite ends engaging said frame side members and confined to vertical movement therealong, load engaging arm means fixed on and projecting forwardly from said cross member, and releasable clamping means fixed on said cross member at a point intermediate the ends of said cross member, said clamping means embracing said vertical rod to hold said load engaging arm means at a selected elevation above said load carrying platform, said vertical rod being displaced rearwardly from the plane of said frame side members, and said clamping means extending rearwardly from said cross member.

3. In a hand truck, a normally vertical frame comprising a pair of laterally spaced side members having upper and lower ends and front and rear sides, a cross brace extending between and fixed to said side members at the lower ends of said side members, a cross bar extending between and fixed to said side members at the upper ends of said side members, a vertical rod parallel to and spaced between said side members, said vertical rod having an upper end fixed to said cross bar and a lower end fixed to said frame cross brace, a load carrying platform mounted on and projecting forwardly from the lower ends of the frame side members, a cross member extending between the frame side members, said cross member having shoes on its opposite ends engaging said frame side members and confined to vertical movement therealong, load engaging arm means fixed on and projecting forwardly from said cross member, and releasable clamping means fixed on said cross member at a point intermediate the ends of said cross member, clamping means at a selected elevation above said load carrying platform, said clamping means a housing slidably engaged with and surrounding said vertical rod, and a spring loaded cam pivoted in said housing and bearing against a side of said vertical rod.

References Cited in the file of this patent

UNITED STATES PATENTS

| | | |
|---|---|---|
| 653,826 | Soule et al. | July 17, 1900 |
| 771,804 | Blomquist | Oct. 11, 1904 |
| 2,514,825 | Zenko | July 11, 1950 |
| 2,549,918 | Miller | Apr. 24, 1951 |
| 2,626,165 | Snyder | Jan. 20, 1953 |